July 30, 1957 W. F. CLEMENCY 2,801,287
CONTROL OF REGULAR AND DISTANT TALKING SUBSCRIBERS SETS
Filed July 16, 1954
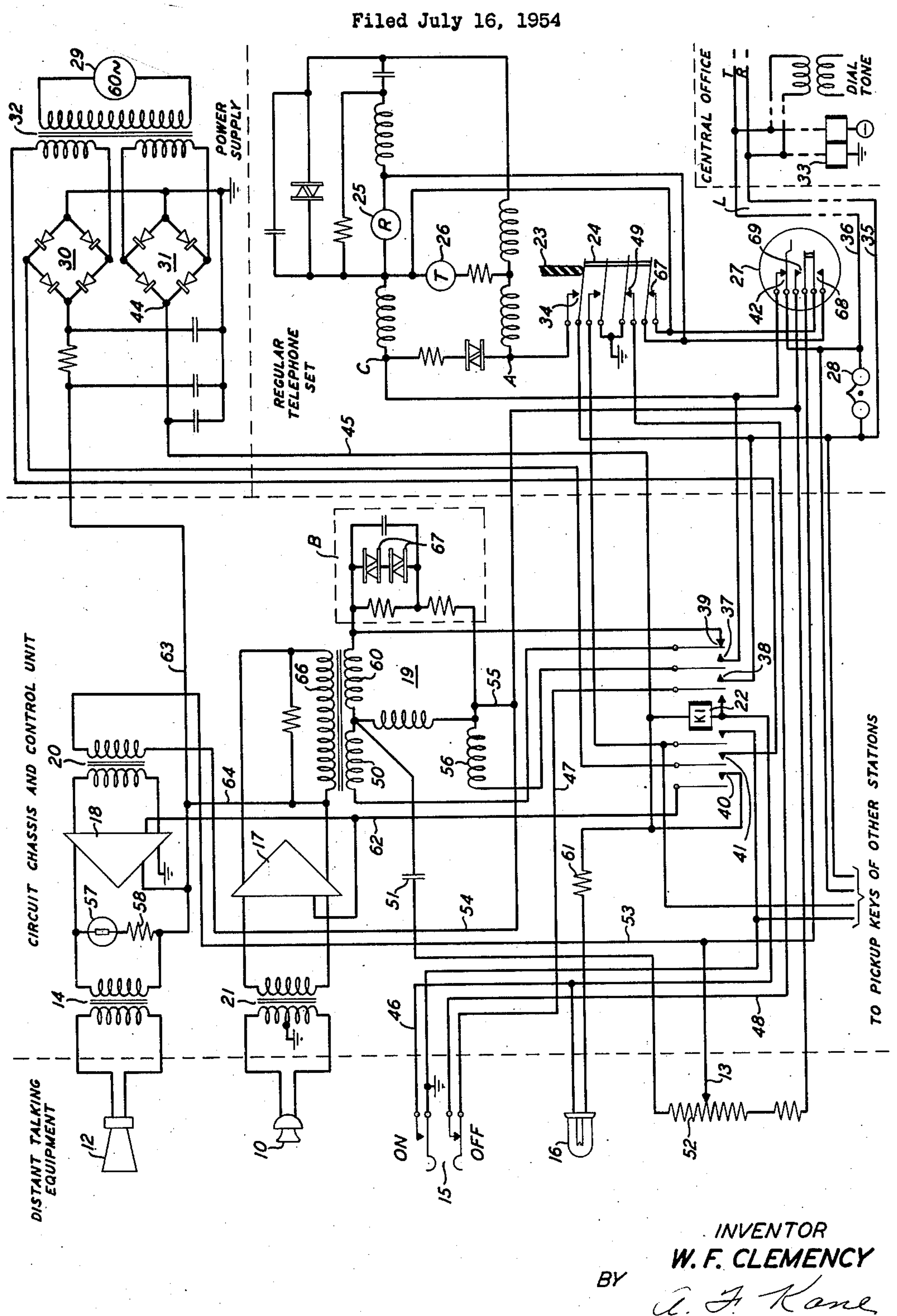
INVENTOR
W. F. CLEMENCY
BY A. F. Kane
ATTORNEY United States Patent Office
2,801,287
Patented July 30, 1957

2,801,287

CONTROL OF REGULAR AND DISTANT TALKING SUBSCRIBERS SETS

William F. Clemency, Summit, N. J., assignor to Bell Telephone Laboratories, Incorporated, New York, N. Y., a corporation of New York Application July 16, 1954, Serial No. 443,792

6 Claims. (Cl. 179—81)

This invention relates to telephone systems and particularly to telephone substation facilities of the type which involve the interchangeable use of telephone sets of the regular and distant talking types.

It is one object of this invention to simplify and otherwise improve substation communication facilities of the type which combines the usual services afforded by a regular telephone set with those furnished by a distant talking set involving a loudspeaker and a distant talking microphone.

In systems of this general character, it is frequently necessary, in the use of the distant talking unit, to provide manually operable switching means of the non-locking type which must be held actuated by the user during conversation and released when conversation is terminated. In accordance with a feature of this invention, the distant talking telephone facility at a subscriber's station is made available on a "hands free" basis. More particularly, the distant talking unit of this invention is provided with switching means which function, in response to a momentary operation of a manually operable key, to connect and effectively lock the unit to the subscriber's line circuit, thereby relieving the user of the necessity for maintaining the line connecting means manually operated continuously.

In accordance with another feature which further emphasizes the "hands free" operation of the substation facilities of this invention, the controls of the regular and distant talking units are so correlated that the distant talking set, having been used on a call incoming to, or originated at the substation, is automatically restored to standby condition in response to the removal of the handset of the regular telephone set when a transfer of the call to the latter set is desired. More particularly, the switching means which connects the distant talking set to the subscriber's line is locked operated under control of a relay which operates, incident to the removal of the handset of the regular telephone from its support, to release the line connecting means of the distant talking set. Thus, the transfer from the distant talking set to the regular telephone set and the restoration of the former to its normal standby condition require only the lifting of the telephone handset from its support.

A further feature of the invention contemplates the use of the dial of the regular telephone set with the distant talking set when the latter is to be employed for communication purposes on a call originated at the substation. To realize this feature the pulsing contacts of the dial are located on the line side of the receiver switchhook contacts and means are provided for including them in the speech path of either the regular telephone set or the distant talking set depending on which set the subscriber desires to use on an originated call.

A further feature of the invention contemplates the use of a self-adjusting impedance network in the circuitry of the distant talking set to automatically compensate for different impedances of the various line lengths encountered in private branch exchange services and thereby to afford a uniformly high standard of performance on connections involving lines of different impedance characteristics.

A still further feature of the invention combines simplification of circuitry with a minimum of apparatus in attaining a substation service involving the correlation of the facilities of a regular telephone set with those of a distant talking set.

These and other features of the invention will be better understood from the following description when read with reference to the accompanying drawing which is a circuit diagram showing, schematically, those elements of a combined three-piece telephone facility which involves the features of this invention. The three major components of this facility are: (1) the desk unit, elements of which are shown at the left and right of the drawing, which comprises a distant talking transmitter, a line connecting key, a signal lamp, a volume control potentiometer, and a regular handset telephone all combined in a housing of the modern combined set type; (2) a loudspeaker which may be placed on the desk at the side of the user opposite to the position of the desk unit; and (3) a control unit which includes input and output amplifiers, a hydbrid coil with its self-adjusting balancing network, a single control relay and the power supply. In practice the line connecting key ("on" and "off" buttons), the volume control and the distant talking transmitter are mounted on the base of the regular telephone set and the signal lamp, when lighted, illuminates the "on" button.

The desk unit, with particular reference to the drawing, includes a microphone 10, a volume control, or regulating switch 13, a line connecting switch 15, a pilot, or signal lamp 16 and a regular telephone set shown at the right of the drawing.

The circuit chassis and control unit includes a two-stage transmitting amplifier 17, a two-stage receiving amplifier 18, a hybrid coil 19, a self-adjusting balancing network B, coupling transformers 14, 20 and 21 and a signal control relay 22.

The regular telephone set per se, is of the modern anti-sidetone combined type involving the handset support shown fragmentarily at 23 which controls the receiver switch-hook 24, a receiver 25, transmitter 26, dial 27, ringer 28 and the necessary coils, condensers, etc. which cooperate in effecting a well-known form of telephone substation circuit.

At the upper right of the drawing there is illustrated a local source 29 of alternating-current power, a pair of full-wave rectifiers 30 and 31 and their associated filtering networks and coupling transformer 32. The rectifier 30 constitutes the direct current "B" supply for the amplifiers 17 and 18 while the rectifier 31 supplies direct current for the operation of relay 22 and for the energization of the filament of signal lamp 16 as well as for the filaments of the amplifier tubes.

The telephone line L serving the substation at which the above-identified equipment is located is shown at the lower right of the drawing extending to a central office or private branch exchange and terminating thereat in the windings of the usual line relay 33.

*Standby condition*

In the standby condition of the equipment involved in this invention, that is, under the normal inactive condition of the equipment, which finds the telephone handset on its support and the line connecting switch 15 in its normal position, the ring conductor 35 of line L to the regular telephone set is open at contacts 34 of hook-switch 24; relay 22 is de-energized and unoperated; the tip conductor 36 of line L to the desk set is open at the front contacts 37 and outermost armature of relay 22;

the ring conductor 35 of line L to the desk set is open at the front contacts 38 and middle right armature of relay 22; the upper series windings 59 and 60 of hybrid coil 19 are short-circuited by the back contacts 39 and outermost right armature of relay 22; pilot lamp 16 is de-energized, its circuit being open at the upper or "on" contacts of key 15; the filament supply lead 45 from rectifier 31 is open at the front contacts 40 and outermost left armature of relay 22; the "B" power supply to amplifiers 17 and 18 is unavailable because of the open condition of the front contacts 41 of relay 22; and the power from source 29 is connected to rectifier 31 by way of the associated lower section of transformer 32.

*Incoming call—regular telephone set*

It will now be assumed that a call on line L to the substation, illustrated, is manifested by the operation of ringer 28 in well-known manner, and that the subscriber answers the call by removing the handset of the regular telephone set from its support.

Under this condition the regular telephone subset is connected to the line L, the ring conductor 35 thereof extending to the point A of the substation circuit by way of the switchhook contacts 34, and the tip conductor thereof extending to the point C of the substation circuit by way of the pulsing contacts 42 of dial 27. Otherwise the circuit conditions are those which prevail under standby condition.

The subscriber may converse with the calling party in the usual manner and at the termination of conversation replaces the handset upon its support, thereby restoring the circuit to normal or standby condition.

*Incoming call—distant talking set*

Should the subscriber desire to answer the incoming call by using the desk set rather than the regular telephone set, the non-locking key 15 is actuated so as to effect the closure of its "on" contacts.

As previously indicated, the ring conductor 35 of line L to the regular telephone set is now open at switchhook contacts 34.

With the "on" contacts of key 15 closed, relay 22 operates in a circuit which extends from terminal 44 of rectifier 31, over conductor 45, through the windings of relay 22, conductor 46, "on" contacts of key 15 to ground. Relay 22 locks operated in a circuit which includes its innermost right armature and front contacts, conductor 47, normally closed "off" contacts of key 15, conductor 48, normally closed contacts 49 of hookswitch 24 to ground. Thus, relay 22 is locked operated under control of key 15 of the desk set and also under control of the switchhook contacts of the regular telephone set.

At its outer right armatures and front contacts relay 22 connects the primary winding of input transformer 20 to the tip and ring conductors 36 and 35 of line L by way of hybrid coil 19 in the following circuit: from the tip conductor 36 of line L, through the pulsing contacts 42 of dial 27, front contacts 37 and outermost right armature of relay 22, line winding 50 of hybrid coil 19, condenser 51, potentiometer section 52 and volume control switch 13, conductor 53, primary winding of input transformer 20, conductors 54 and 55, line winding 56 of hybrid coil 19, middle right armature and front contact 38 of relay 22, to the ring conductor 35 of line L. Any speech signals transmitted over line L to the substation are thus impressed on the transformer 20, are amplified in the amplifier 18 and impressed on the loudspeaker 12 by way of transformer 14.

A thermistor 57 and a series connected resistor 58 are bridged across the primary winding of input transformer 14 to the loudspeaker and function to limit singing. Beyond a critical setting of the volume control switch 13, singing in the loudspeaker 12 would manifest itself and would tend to increase in amplitude and cause the amplifier tubes to become overloaded. The thermistor 57 acts to limit the acoustical level of singing should it occur. It acts as a variable load on the amplifier 18 and goes to a low resistance value when singing occurs due to the alternating voltage present at this time. It also limits the alternating current which may be applied to the telephone line when singing occurs.

At its outermost right armature and back contacts relay 22 removes a short circuit from the windings 50 and 60 of hybrid coil 19.

Signal lamp 16 is now lighted in a circuit extending from terminal 44 of rectifier 31, over conductor 45, resistor 61, filament of lamp 16, locking contacts of relay 22, conductor 47, "off" contacts of key 15, conductor 48, to ground by way of contacts 49 of hookswitch 24.

At its outermost left armature and front contacts 40 relay 22 extends the direct-current supply lead 45 to the filaments of the tubes of amplifier 17 and 18 by way of conductor 62.

At its front contacts 41 and middle left armature relay 22 completes the connection of the upper secondary winding of power transformer 32 to rectifier 30, thus establishing the "B" supply to amplifiers 17 and 18 by way of conductors 63 and 64.

Since the windings 50 and 56 of hybrid coil 19 are now connected to the tip and ring conductors of line L, any speech signals generated at the transmitter 10 are transmitted over the line L by way of transformer 21, amplifier 17 and thence to input coil 66 and the hybrid coil windings 50 and 56. Thus, two-way conversation may be carried on between the calling party and the called subscriber, the latter employing the desk unit for communication purposes.

When conversion is completed, the key 15 is momentarily actuated to its "off" position causing the locking circuit for relay 22 to be interrupted whereupon relay 22 is de-energized and releases its armatures. The communication facilities are thus restored to standby condition.

Relay 22 at its outermost right armature and back contacts short-circuits the windings 50 and 60 of hybrid coil 19 to prevent a short spurt of singing to manifest itself on disconnect.

Since the distant talking set may be employed on private line loops of varying lengths, such as are encountered on private branch exchange and central office calls, and the impedance connected to the set will at the line vary accordingly, it is desirable that a self-adjusting balancing arrangement be provided. These differences in loop direct current control the impedance of varistors 67 in the varistor balancing network B so that the network impedance more nearly balances the impedance of the line. The series-parallel arrangement of the varistors 67 provides a sufficient range in impedance when under control of the direct-current supply to the set so that an adequate balance is obtained for the various line loop lengths which may be encountered under ordinary operating conditions.

*Outgoing call—regular telephone set*

To originate a call at the subscriber station involving the regular telephone set, the telephone handset is removed from its support and upon the subsequent receipt of dial tone, the dial 27 is operated in the usual manner in accordance with the digits of the telephone number of the line with which connection is desired.

At switchhook contacts 34 the ring conductor 35 of line L is extended to the telephone substation circuit. At contacts 49 ground potential is removed from conductor 48 and at contacts 67 the normally completed shunt about the receiver 25 is opened; this shunt however is restored during dialing by the off-normal dial contacts 68 to prevent dial clicks being heard in the receiver. The dial off-normal contacts 69 function during dialing (when the desk set is to be used) to shunt the primary winding of input transformer 20 and thereby prevent clicks from being manifested in the loudspeaker 12. With the closure of switchhook contacts 34 the telephone subset circuit is extended to the ring conductor 35 of line L and since the tip conductor 36 is connected to the subset by way of the pulsing contacts 42 of the dial 27 the communication circuit is complete.

*Outgoing call—distant talking set*

To originate a call involving the distant talking telephone set, the key 15 is actuated to its "on" position and the ensuing circuit changes are the same as described hereinbefore in connection with the answering of an incoming call.

In this instance, however, dial tone which is connected to the line in well-known manner at the central office is transmitted over the incoming speech path and is heard in the loudspeaker 12.

Without removing the handset of the regular telephone set from its support the dial 27, which is a component thereof, is operated in accordance with the digits of the telephone number of the called line. It will be observed in this respect that the pulsing contacts 42 of the dial are included in the tip conductor of the line on the line side of the switchhook contacts, thus making the dial available for use with the distant talking set without the necessity of removing the handset of the regular telephone set as is required when the latter set is to be used.

When the dial 27 is moved off-normal, the dial contacts 68 function to short-circuit the receiver 25 while the contacts 69 function to shunt the input to the receiver amplifier transformer 20 so as to preclude the possibility of dial clicks being heard in the loudspeaker. Actually, the contacts 68 function to shunt receiver 25 effectively only when the regular telephone set is to be used, as the switchhook contacts 67 normally shunt the receiver when the handset is on its support.

*Transfer from distant talking set to regular talking set*

If, during a call which has been answered or originated at the substation by the momentary actuation of key 15 to its "on" position, it becomes desirable to transfer the call to the regular telephone facility, it is only necessary to lift the handset of the regular set. When this is done the switchhook contacts 49 are opened and cause the interruption of the locking circuit to relay 22. Relay 22 thereupon is de-energized and releases its armatures, thus disconnecting the distant talking set from the line L. At switchhook contacts 34 the connection of the regular telephone set to the line L is completed. The release of relay 22 also causes the lamp signal 16 to be extinguished.

*Transfer from regular telephone set to distant talking set*

In the event a call is answered or originated by the removal of the handset of the regular telephone set from its support and it becomes desirable to transfer the call to the distant talking set, it is necessary only to hold key 15 actuated to the "on" position until the handset is restored to its support. The operation of key 15 to the "on" position prepares an operating circuit for relay 22 which is completed to ground at the key contacts and since the locking circuit for relay 22 is open at switchhook contacts 49 until the handset is replaced on its support the key 15 must be held operated until the switchhook contacts 49 are closed which occurs immediately upon restoration of the handset to its support. Relay 22 performs the same functions when operated in this manner as it did when operated incident to the answering or origination of a call, as previously described.

It will be observed that power is connected at all times to rectifier 31 so as to insure the instantaneous operation of relay 22.

What is claimed is:

1. In a telephone system, a telephone line, a substation thereon, a regular telephone set at said substation comprising a telephone handset, a distant talking set at said substation comprising a microphone and a loudspeaker, switching means associated with said distant talking set, means responsive to a momentary operation of said switching means for connecting said distant talking set to said line and for maintaining the connection independent of said switching means, other switching means associated with said distant talking set, and switching means controlled by the telephone handset of said regular telephone set, said last two switching means being operable independently to disconnect said distant talking set from said line.

2. In a telephone system, a telephone line, a regular telephone set comprising a telephone handset, a distant talking set comprising a microphone and a loudspeaker, a pair of switches associated with said distant talking set, receiver switchhook contacts associated with said regular telephone set, a relay responsive to a momentary operation of one of said switches, means controlled by said relay for connecting said distant talking set to said line, and a locking circuit for said relay including serially connected contacts of the other of said switches and certain of said receiver switchhook contacts.

3. In a telephone system, a telephone line, apparatus adapted to be connected to said line for conversation thereover and comprising, in combination, a hybrid coil, transmitting means including an amplifier and receiving means including an amplifier, said transmitting and receiving means adapted to be interconnected one with the other and with said hybrid coil to form a substation circuit, said hybrid coil having a pair of line terminals connected to said line and a pair of network terminals, and a self-adjusting impedance network including serially connected pairs of oppositely poled varistors having voltage dependent impedance characteristics connected to said network terminals for maintaining an impedance balance which varies with the length of line to which the line terminals of said hybrid coil may be connected.

4. Telephone substation apparatus for connection to a telephone line comprising, in combination, transmitting means and receiving means adapted to be interconnected to form a substation circuit, said receiving means including an amplifier and a tandem connected loudspeaker, a transformer coupling said amplifier and said loudspeaker, an input circuit for said amplifier, a volume control associated with the input circuit to said amplifier for adjusting the level of the signals transmitted through said amplifier to said loudspeaker, the amplitude of said signals having a tendency to build up and overload said amplifier to produce singing, and means for limiting the singing amplitude of said signals comprising a voltage control device having a negative temperature coefficient of resistance and a serially connected resistor connected across the primary winding of said coupling transformer.

5. A telephone substation apparatus adapted to be connected to a telephone line for communication purposes comprising, in combination with a telephone line having tip and ring conductors, a telephone substation circuit including speech transmitting and receiving means, switchhook contacts, and a telephone dial having pulsing contacts, an auxiliary substation circuit including speech transmitting and receiving means and a hybrid coil having a pair of line windings, means including the pulsing contacts of said dial for directly connecting the tip conductor of said line to said first substation circuit, means including normally open contacts of said switchhook contacts adapted to connect the ring conductor of said line to said first substation circuit, a relay, switching means controlled by said relay for connecting one of the line windings of said hybrid coil in series with the tip conductor of said line by way of the pulsing contacts of said dial, other switching means controlled by said relay for connecting the other line winding of said hybrid coil in series with the ring conductor of said line, a manually operable non-locking key, means controlled by said key when momentarily operated for operating said relay, and means including normally closed contacts of said switchhook contacts for controlling the release of said relay whereby the connections of the first and auxiliary substation circuits to the tip and ring conductors of said line are controlled independently by the said switchhook contacts and said non-locking key, respectively, and the disconnection of said auxiliary substation circuit from said tip and ring conductors of said line is controlled by said switchhook contacts.

6. In a telephone system, a telephone line, a telephone substation comprising speech transmitting and receiving channels, a hybrid coil associated with said channels and including a pair of line windings and network terminals, switching means for connecting the line windings of said hybrid coil to said line, a self-adjusting balancing network connected to the network terminals of said hybrid coil and including a series-parallel arrangement of varistors which function to automatically compensate for different impedances of said telephone line because of varying lengths thereof, a two-position key, means responsive to the momentary actuation of said key to one of its positions for connecting said substation circuit to said telephone line, a second telephone substantion comprising speech transmitting and receiving means included in an anti-sidetone circuit and a receiver switchhook, means including contacts controlled by said receiver switchhook for connecting said second telephone substation to said line, means controlled by said key when actuated to its other position for disconnecting said first substation from said line, means controlled by said receiver switchhook for disconnecting said first substation from said line and substituting said second substation therefor, and means controlled jointly by said key when operated to the said one of its positions and said receiver switchhook for disconnecting said second substation from said line and substituting said first substation therefor.

References Cited in the file of this patent

UNITED STATES PATENTS 2,300,044 Dewire ---------------- Oct. 27, 1942